United States Patent
Gleason et al.

(10) Patent No.: US 9,053,432 B2
(45) Date of Patent: Jun. 9, 2015

(54) WAVEFORM MAPPING TECHNIQUE AND PROCESS FOR TRACKING AND ESTIMATING EVOLUTION OF SEMANTIC NETWORKS

(75) Inventors: Gary W. Gleason, Tampa, FL (US); Richard E. Neese, Palm Harbor, FL (US); Christopher R. Eck, Dunedin, FL (US)

(73) Assignee: Raytheon Company, Waltham, MA (US)

( * ) Notice: Subject to any disclaimer, the term of this patent is extended or adjusted under 35 U.S.C. 154(b) by 831 days.

(21) Appl. No.: 13/205,884

(22) Filed: Aug. 9, 2011

(65) Prior Publication Data

US 2012/0036093 A1 Feb. 9, 2012

Related U.S. Application Data

(60) Provisional application No. 61/372,064, filed on Aug. 9, 2010.

(51) Int. Cl.
*G06N 99/00* (2010.01)

(52) U.S. Cl.
CPC ..................... *G06N 99/005* (2013.01)

(58) Field of Classification Search
CPC .................................................. G06N 99/005
See application file for complete search history.

(56) References Cited

U.S. PATENT DOCUMENTS

2008/0271143 A1* 10/2008 Stephens et al. ............... 726/22
2010/0204969 A1* 8/2010 Hariharan et al. ............... 703/2

OTHER PUBLICATIONS

Temporal Visualization and Analysis of Social Networks, by Gloor, published 2004.*
Excel 2007 Charts, by Walkenbach, published 2007.*
Detection of Power User Patterns Among High School Students in a Mobile Communication Network, by Gloor, published 2005.*
Social Structure from Multiple Networks, by White, published 1976.*
Visualizing the Signatures of Social Roles in Online Discussion Groups, by Welser, published 2007.*
The Time-Series Link Prediction Problem with Applications in Communications Sueveillance, by Huang, published Nov. 2008.*
Multi-object tracking using semantic analysis and Kalman filter, by Pathan, published Sep. 2009.*
White, H. C., Boorman, S. C., and Breiger, R. L., *American Journal of Sociology*, vol. 81, No. 4, 730-780, 1976, 51 pages.

* cited by examiner

*Primary Examiner* — David Vincent
*Assistant Examiner* — Thomas Fink
(74) *Attorney, Agent, or Firm* — Daly, Crowley, Mofford & Durkee, LLP (57) ABSTRACT

In certain embodiments, a computer-implemented method includes accessing first and second data associated with a semantic network, the first data indicating a first plurality of nodes within the semantic network and a first plurality of relationships between the first plurality of nodes at a first time, and the second data indicating a second plurality of nodes within the semantic network and a second plurality of relationships between the second plurality of nodes at a second time. The method further includes generating a first waveform from the first data and a second waveform from the second data. The waveforms indicate an activity level of each of the nodes within the semantic network. The method further includes analyzing the semantic network using the generated first and second waveforms.

19 Claims, 9 Drawing Sheets

ADJACENCY MATRIX

| | JUDGE A | GOVERNOR | CONGRESS | LOBBYIST A | REPRESENT | TREASURER | LOBBYIST B | FIRE | EM SVCS | MAYOR | ADMIN | PARKS/REC | POLICE | DEPUTY MAYOR | JUDGE B | SHERIFF |
|---|---|---|---|---|---|---|---|---|---|---|---|---|---|---|---|---|
| JUDGE A | | X | | | | | | | | | | | | | | |
| GOVERNOR | X | | X | | | | | | | | | | | | | |
| CONGRESSMAN | | X | | X | | | | X | X | | | | | | | |
| LOBBYIST A | | | X | | X | | | | | | | | | | | |
| REPRESENTATIVE | | | | X | | X | X | | X | | | | | | | |
| TREASURER | | | | | X | | | | | | | | | | | |
| LOBBYIST B | | | | | X | | | X | | | | | | | | |
| FIRE | X | | | | | | | | X | X | | X | X | | | |
| EM SVCS | | | | | | | | X | | X | | | X | | | |
| MAYOR | | | | | | | | | X | | X | | X | X | | |
| ADMIN | | | | | | | | | | X | | | | | | X |
| PARKS/REC | | | | | | | | | | | | | X | | | |
| POLICE | | | | | | | | | | X | | | | | | |
| DEPUTY MAYOR | | | | | | | | | | X | | | | | X | |
| JUDGE B | | | | | | | | | | | | | | X | | X |
| SHERIFF | | | | | | | | | | | X | | | | X | |

FIG. 8

WAVEFORM MAPPING TECHNIQUE AND PROCESS FOR TRACKING AND ESTIMATING EVOLUTION OF SEMANTIC NETWORKS

CROSS-REFERENCE TO RELATED APPLICATION

This application claims the benefit of priority under 35 U.S.C. §119(e) of U.S. Provisional Application Ser. No. 61/372,064, entitled "WAVEFORM MAPPING TECHNIQUE AND PROCESS FOR TRACKING AND ESTIMATING EVALUATION OF SEMANTIC NETWORKS," filed Aug. 9, 2010.

BACKGROUND

A semantic network may, in part, refer to a group of entities and their relationships to one another. A social network is a particular type of semantic network that generally includes multiple individuals who are interconnected with one another through one or more relationships or other suitable types of connections. Social network analysis is a field of study in which social networks may be identified, visualized, and researched. In many cases, the social network may be modeled by a graph in which individuals are represented by nodes and their relationship with one another is represented by ties or edges.

SUMMARY

In certain embodiments, a waveform mapping technique and process for tracking and estimating the evolution of semantic networks creates multiple sequential adjacency matrices using one or more rules associated with a semantic network. Upon creation of each newly acquired adjacency matrix, the analysis system may generate a waveform according the newly acquired adjacency matrix and the waveform from any previously acquired adjacency matrices.

Certain embodiments of the present disclosure may provide one or more technical advantages. Embodiments of the present disclosure may provide techniques for tracking a semantic network over time. Certain embodiments provide an orderly and reproducible mechanism for estimating future evolution and behavior of a semantic network. In certain embodiments, an ability to track and predict future behavior of an entity may allow an analyst to determine one or more effects of taking a particular action with respect to the entity.

In certain embodiments, the present disclosure may assist an analyst in determining the identities of members of a semantic network (e.g., a business, government, or other suitable organization) and the relationships among the individuals, as a function of time and space. The analyst may be provided with an explicit or implicit organizational structure of the network that denotes the relationships among members of the network, and may allow the analyst to determine effects of proactive actions that may be taken on the network.

Certain embodiments of the waveform mapping technique and process for tracking and estimating evolution of semantic networks may generate waveforms from semantic networks, such as social networks using a binning technique in which information from sensors is categorized according to certain threshold levels. In this manner, spurious noise may be filtered from the waveform to reveal useful information. For example, graphs representing social networks may be mapped into a domain to provide meaningful analysis of the social network and/or provide additional processing techniques to be applied to the acquired information. In certain embodiments, graphs may be mapped into a waveform to observe behavioral changes in the network by viewing it in its new domain. Additionally, multiple sequential adjacency matrices may be merged using a Kalman filter or other estimation and prediction technique to determine additional information about the evolving nature of the social network. Thus, mapping adjacency matrices associated with social networks to waveforms may provide information about social networks that has heretofore not been realized.

Certain embodiments of the present disclosure may provide some, all, or none of these advantages. Certain embodiments may provide one or more other technical advantages, one or more of which may be readily apparent to those skilled in the art from the figures, descriptions, and claims included herein.

BRIEF DESCRIPTION OF THE DRAWINGS

For a more complete understanding of the present disclosure and its advantages, reference is made to the following descriptions, taken in conjunction with the accompanying drawings, in which.

DESCRIPTION OF EXAMPLE EMBODIMENTS

Semantic networks are often complex and may include numerous nodes and multiple ties between the nodes. For example, a social network may include numerous individuals, and each individual may have multiple relationships between other individuals in the social network. Typically, semantic networks change and evolve over time. Because semantic networks are typically complex, are constantly evolving, and can have a large number of nodes and edges, they may be difficult to uncover and monitor over time.

It may be desirable to track and estimate the evolution of semantic networks. FIGS. 1A through 8 below illustrate a waveform mapping technique and process for tracking and estimating evolution of semantic networks according to certain embodiments of the present disclosure.

Figure 1A:
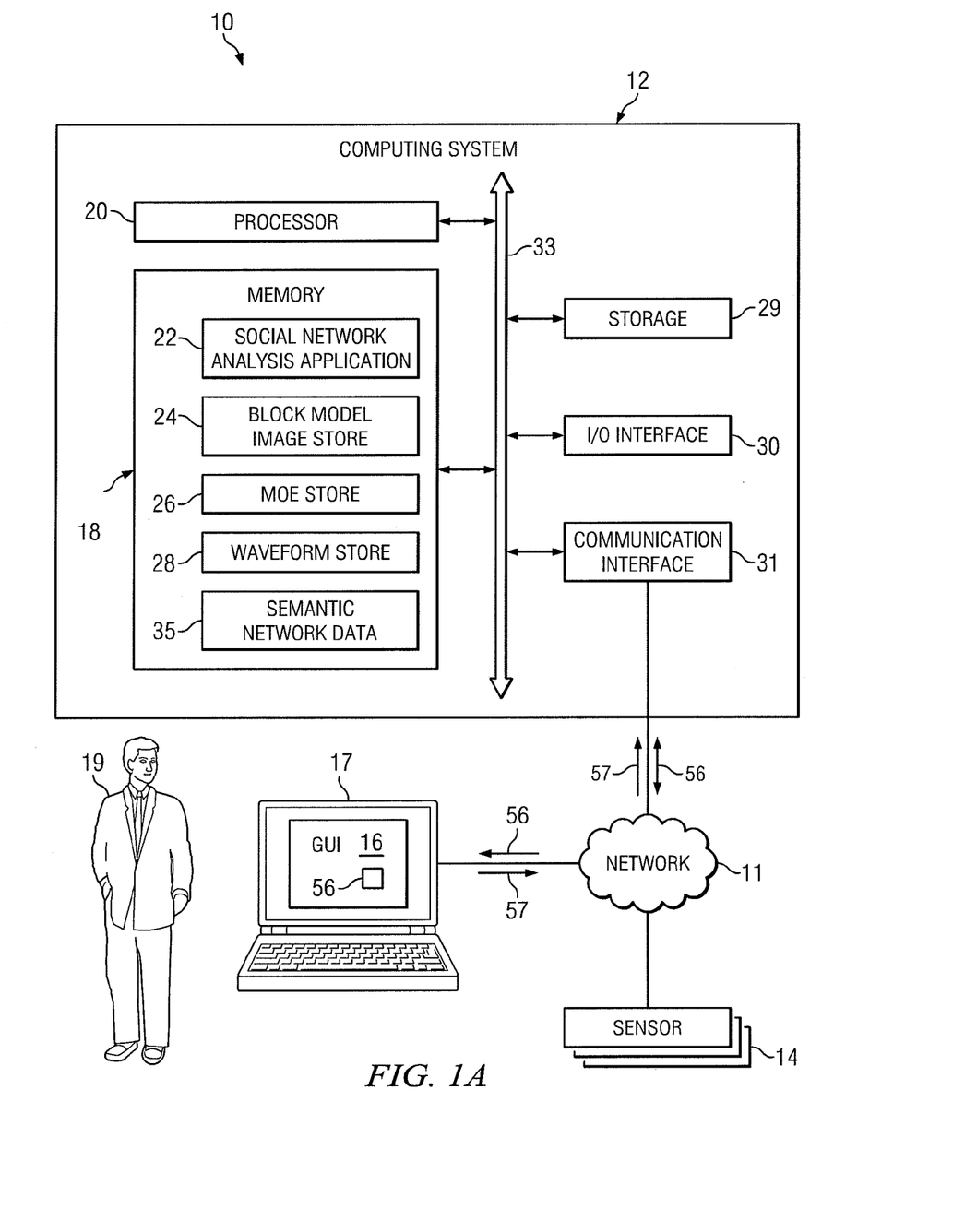
FIG. 1A illustrates an example semantic network analysis system according to certain embodiments of the present disclosure.

FIG. 1A illustrates an example semantic network analysis system 10 according to certain embodiments of the present disclosure. The example semantic network analysis system 10 includes a computing system 12, one or more sensors 14, a client 17, and a network 11. In some embodiments, computing system 12, client 17, and sensors 14 are communicatively coupled via network 11. In other embodiments, sensors 14 and/or clients 17 may be communicatively coupled directly to computing system 12. Although this particular implementation of semantic network analysis system 10 is illustrated and primarily described, the present disclosure contemplates semantic network analysis system 10 being coupled in any suitable manner and having any suitable components, according to particular needs.

In general, embodiments of the present disclosure provide an automated semantic networking analysis application to aid an analyst 19 in uncovering and tracking an organizational structure, which may evolve over time. The application may receive from a variety of sources data associated with a semantic network and represent some or all of the data in a suitable format. Some embodiments may apply appropriate processing to analyze and track the organizational structure of the network and identify and indicate effects, if appropriate.

A semantic network may include any suitable one or more entities and the relationships among (or other suitable connections) and/or within the one or more entities. The one or more entities may include any suitable combination of individuals, governments, business enterprises, terrorist or other rogue organizations, devices, concepts, and any other suitable entities. The semantic network may include the entity, the structure of the entity (e.g., including the roles and the relationships among the roles, such as the hierarchical structure of a government or business enterprise), the identities (and potentially biographical backgrounds) of the individuals who are members of the entity, and any other suitable information. It should be noted that the entities and the members of an entity may include both human and non-human members.

As an example, a semantic structure may include a social network. As a particular example of a social network, a social network may include a government, the organizational structure of the government (including the roles and relationships among roles), and the actual individuals filling the roles of the organizational structure.

Embodiments of the present disclosure may assist in determining the structure of the semantic network and to help track and predict the future of the semantic network. Embodiments of the disclosure treat the semantic network as observational evidence from a sensor and use waveforms to uncover and possibly monitor and track the behavior of the semantic network.

Embodiments of the present disclosure may assist one or more of the following analysts 19: (1) enablers for national security in uncovering adversarial organizational structures; (2) enablers for renewable energy market penetration; (3) enablers for joint ventures, mergers and acquisitions; (4) force multipliers for business intelligence analysts; and (5) any other suitable analysts. It should be understood that this list of applications of the present disclosure is for example purposes only.

Returning to FIG. 1A, client 17 may refer to any device that enables analyst 19 to interact with computing system 12. In some embodiments, client 17 may include a computer, workstation, telephone, Internet browser, electronic notebook, Personal Digital Assistant (PDA), pager, or any other suitable device (wireless, wireline, or otherwise), component, or element capable of receiving, processing, storing, and/or communicating information with other components of semantic network analysis system 10. Client 17 may also comprise any suitable user interface, display, microphone, keyboard, or any other appropriate terminal equipment usable by an analyst 19. It will be understood that semantic network analysis system 10 may comprise any number and combination of clients 17.

In some embodiments, client 17 may include a graphical user interface (GUI) 16. GUI 16 is generally operable to tailor and filter data presented to analyst 19, and to capture input data 57 from analyst 19. GUI 16 may comprise a plurality of displays having forms, interactive fields, pull-down lists, and buttons operated by analyst 19. GUI 16 may include multiple levels of abstraction including groupings and boundaries. It should be understood that the term GUI 16 may be used in the singular or in the plural to describe one or more GUIs 16 and each of the displays of a particular GUI 16.

In general, GUI 16 may be any suitable interface that is generated by any suitable application. In some embodiments, GUI 16 may be generated by a stand-alone application that is stored on and is executed by client 17. In some embodiments, GUI 16 may be a web-based application that is provided by computing system 12 over network 11 and displayed in any appropriate internet browser, including, but not limited to, Microsoft Internet Explorer, Mozilla Firefox, Google Chrome, Apple Safari, Opera, a browser of a smartphone, or any other appropriate browser.

GUI 16 of client 17 may communicate with computing system 12 to receive user input and display results for a semantic network analysis application 22 of computing system 12. In certain embodiments, GUI 16 functions with computing system 12 using a client/server type model. Client 17 may include a display, such as a cathode ray tube (CRT) or a liquid crystal display (LCD) on which to display GUI 16. Client 17 interface 16 may also include a keyboard, a mouse, a console button, or other type of user input device for inputting information from an analyst 19. Client 17 may transmit user input 57 to computing system 12 via network 11.

In certain embodiments, network 11 may refer to any interconnecting system capable of transmitting audio, video, signals, data, messages, or any combination of the preceding. Network 11 may include all or a portion of a public switched telephone network, a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In certain embodiments, sensors 14 measure characteristics of semantic networks and transmit the measured characteristics to semantic network analysis application 22 of computing system 12 for analysis. Any suitable type and quantity of sensors 14 may be used. For example, sensors 14 may include one or more port sniffers that monitor computer network traffic transmitted among computing systems used by members of the organization. As another example, sensors 14 may include one or more telephony sniffing devices that monitor telecommunication traffic, such as phone conversations, short messaging service (SMS) messages, or the like that is transmitted among members of the organization. As another example, sensors 14 may include one or more computer network monitoring devices that monitor specific web portals, such as Facebook™ or Twitter™, for correspondence that may occur among members of the organization. Sensors 14 may include human sources of information such as intelligence agents or other suitable individuals who may gather or otherwise receive data regarding a semantic network and provide that data to system 10 (e.g., through some type of processing device).

In certain embodiments, sensors 14 may include sources of information such as rendered waveforms from another cooperative instance of system 10 participating on network 11. For example, one instance of system 10 may receive one or more generated waveforms 56 (described in more detail below) from another cooperative system 10 via network 11. In this manner, the cooperative instance of system 10 extends both the semantic network and the sensor and waveform space. As a result, multi-spectral analysis may be performed on different waveforms 56 generated from different representations of the semantic information.

Computing system 12 performs one or more steps of one or more methods described or illustrated herein. In particular embodiments, one or more computing systems 12 provide functionality described or illustrated herein. In particular embodiments, software running on one or more computing systems 12 performs one or more steps of one or more methods described or illustrated herein or provides functionality described or illustrated herein. Particular embodiments include one or more portions of one or more computing systems 12.

Computing system 12 may be in any suitable physical form. As example and not by way of limitation, computing system 12 may be a virtual machine (VM), an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a server, an application server, or a combination of two or more of these. Where appropriate, computing system 12 may include one or more computing systems 12; be unitary or distributed; span multiple locations; span multiple machines; or reside in a cloud, which may include one or more cloud components in one or more networks. Where appropriate, one or more computing systems 12 may perform without substantial spatial or temporal limitation one or more steps of one or more methods described or illustrated herein. As an example and not by way of limitation, one or more computing systems 12 may perform in real time or in batch mode one or more steps of one or more methods described or illustrated herein. One or more computing systems 12 may perform at different times or at different locations one or more steps of one or more methods described or illustrated herein, where appropriate.

In some embodiments, computing system 12 may execute any suitable operating system such as IBM's zSeries/Operating System (z/OS), MS-DOS, PC-DOS, MAC-OS, WINDOWS, UNIX, OpenVMS, an operating system based on LINUX, or any other appropriate operating system, including future operating systems. In some embodiments, computing system 12 may be a web server running web server applications such as Apache, Microsoft's Internet Information Server™, and the like.

In particular embodiments, computing system 12 includes a processor 20, memory 18, storage device 29, an input/output (I/O) interface 30, a communication interface 31, and a bus 33. Although this disclosure describes and illustrates a particular computing system 12 having a particular number of particular components in a particular arrangement, this disclosure contemplates any suitable computing system 12 having any suitable number of any suitable components in any suitable arrangement.

In particular embodiments, processor 20 includes hardware for executing instructions, such as those making up social network analysis application 22. As an example and not by way of limitation, to execute instructions, processor 20 may retrieve (or fetch) the instructions from an internal register, an internal cache, memory 18, or storage device 29; decode and execute the instructions; and then write one or more results to an internal register, an internal cache, memory 18, or storage device 29. In particular embodiments, processor may include one or more internal caches for data, instructions, or addresses. This disclosure contemplates processor 20 including any suitable number of any suitable internal caches, where appropriate. As an example and not by way of limitation, processor 20 may include one or more instruction caches, one or more data caches, and one or more translation lookaside buffers (TLBs). Instructions in the instruction caches may be copies of instructions in memory 18 or storage device 29, and the instruction caches may speed up retrieval of those instructions by processor 20. Data in the data caches may be copies of data in memory 18 or storage device 29 for instructions executing at processor 20 to operate on; the results of previous instructions executed at processor 20 for access by subsequent instructions executing at processor 20 or for writing to memory 18 or storage device 29; or other suitable data. The data caches may speed up read or write operations by processor 20. The TLBs may speed up virtual-address translation for processor 20. In particular embodiments, processor 20 may include one or more internal registers for data, instructions, or addresses. This disclosure contemplates processor 20 including any suitable number of any suitable internal registers, where appropriate. Where appropriate, processor 20 may include one or more arithmetic logic units (ALUs); be a multi-core processor; or include one or more processors 20. Although this disclosure describes and illustrates a particular processor, this disclosure contemplates any suitable processor.

In particular embodiments, memory 18 includes main memory for storing instructions such as social network analysis application 22 for processor 20 to execute, or data such as semantic network data 35 for processor 20 to operate on. As an example and not by way of limitation, computer system 12 may load instructions from storage device 29 or another source (e.g., another computing system 12) to memory 18. Processor 20 may then load the instructions from memory 18 to an internal register or internal cache. To execute the instructions, processor 20 may retrieve the instructions from the internal register or internal cache and decode them. During or after execution of the instructions, processor 20 may write one or more results (which may be intermediate or final results) to the internal register or internal cache. Processor 20 may then write one or more of those results to memory 18. In particular embodiments, processor 20 executes only instructions in one or more internal registers or internal caches or in memory 18 (as opposed to storage device 29 or elsewhere) and operates only on data in one or more internal registers or internal caches or in memory 18 (as opposed to storage device 29 or elsewhere). One or more memory buses (which may each include an address bus and a data bus) may couple processor 20 to memory 18. Bus 33 may include one or more memory buses, as described below. In particular embodiments, one or more memory management units (MMUs) reside between processor 20 and memory 18 and facilitate accesses to memory 18 requested by processor 20.

In certain embodiments, instructions executed by processor 20 may reside in one or more computer programs such as social network analysis application 22. A computer program generally refers to instructions, logic, rules, algorithms, code, tables, or other suitable instructions for performing the described functions and operations. In some embodiments, a computer program such as social network analysis application 22 may be stored in memory 18, storage device 29, or any other location accessible to computing system 12. Where appropriate, a computer program may include one or more computer programs; be unitary or distributed; span multiple locations; span multiple machines; or reside in a cloud.

In particular embodiments, storage device 29 includes mass storage for data or instructions such as social network analysis application 22. As an example and not by way of limitation, storage device 29 may include an HDD, a floppy disk drive, flash memory, an optical disc, a magneto-optical disc, magnetic tape, a Universal Serial Bus (USB) drive, a solid-state drive (SSD), or a combination of two or more of these. Storage device 29 may include removable or non-removable (or fixed) media, where appropriate. Storage device 29 may be internal or external to computing system 12, where appropriate. In particular embodiments, storage device is non-volatile, solid-state memory. In particular embodiments, storage device 29 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates storage device 29 taking any suitable physical form. Storage device 29 may include one or more storage control units facilitating communication between processor 20 and storage device 29, where appropriate. Where appropriate, storage device 29 may include one or more storage devices 29. Although this disclosure describes and illustrates particular storage, this disclosure contemplates any suitable storage.

In particular embodiments, I/O interface 30 includes hardware, software, or both providing one or more interfaces for communication between computing system 12 and one or more I/O devices. System 10 may include one or more of these I/O devices, where appropriate. One or more of these I/O devices may enable communication between a user and computing system 12. As an example and not by way of limitation, an I/O device may include a keyboard, keypad, microphone, monitor, mouse, printer, scanner, speaker, still camera, stylus, tablet, touchscreen, trackball, video camera, sensor, another suitable I/O device or a combination of two or more of these. This disclosure contemplates any suitable I/O devices and any suitable I/O interfaces 30 for them. Where appropriate, I/O interface 30 may include one or more devices or software drivers enabling processor 20 to drive one or more of these I/O devices. I/O interface 30 may include one or more I/O interfaces 30, where appropriate. Although this disclosure describes and illustrates a particular I/O interface 30, this disclosure contemplates any suitable I/O interface 30.

In particular embodiments, communication interface 31 includes hardware, software, or both providing one or more interfaces for communication (e.g., packet-based communication and facsimile communication) between computing system 12 and one or more other computing systems 12, one or more networks such as network 11, client 17, and sensors 14. As an example and not by way of limitation, communication interface 31 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 31 for it. As an example and not by way of limitation, computing system 12 may communicate with an ad hoc network, a personal area network (PAN), a local area network (LAN), a wide area network (WAN), a metropolitan area network (MAN), one or more portions of the Internet, a PSTN, or a combination of two or more of these. One or more portions of one or more of these networks may be wired or wireless. As an example, computing system 12 may communicate with a wireless PAN (WPAN) (e.g., a BLUETOOTH WPAN), a WI-FI network, a WI-MAX network, a cellular telephone network (e.g., a Global System for Mobile Communications (GSM) network), or other suitable wireless network or a combination of two or more of these. Computing system 12 may include any suitable communication interface 31 for any of these networks, where appropriate. Communication interface 31 may include one or more communication interfaces 31, where appropriate. Although this disclosure describes and illustrates a particular communication interface, this disclosure contemplates any suitable communication interface.

In particular embodiments, bus 33 includes hardware, software, or both coupling components of computing system 12 to each other. As an example and not by way of limitation, bus 33 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 33 may include one or more buses 33, where appropriate. Although this disclosure describes and illustrates a particular bus, this disclosure contemplates any suitable bus or interconnect.

As described above, memory 18 may store social network analysis application 22. In certain embodiments, memory 18 may also store a block modeling image store 24, a measure-of-effectiveness (MOE) store 26, a waveform store 28, and semantic network data 35. Block modeling image store 24, MOE store 26, waveform store 28, and semantic network data 35 are described in more detail below.

Semantic network data 35 may refer to data related to a semantic network that is in any appropriate format. In certain embodiments, semantic network data 35 indicates each of the entities/nodes of a semantic network and the ties between each of the entities/nodes. In certain embodiments, semantic network data 35 may refer to a graph of a social network, or to data describing a graph of a social network. For example, FIG. 2A below illustrates an example of a social network 42 that semantic network data 35 may be associated with. In certain embodiments, semantic network data 35 may be partitioned into individual records or sets, and each record/set of semantic network data 35 is associated with a particular semantic network at a specific time. In certain embodiments, system 10 may receive from one or more sensors 14 first semantic network data 35 describing a semantic network at a first time, and at a subsequent time, receive subsequent semantic network data 35 describing the semantic network at one or more times after the first time.

Figure 1B:
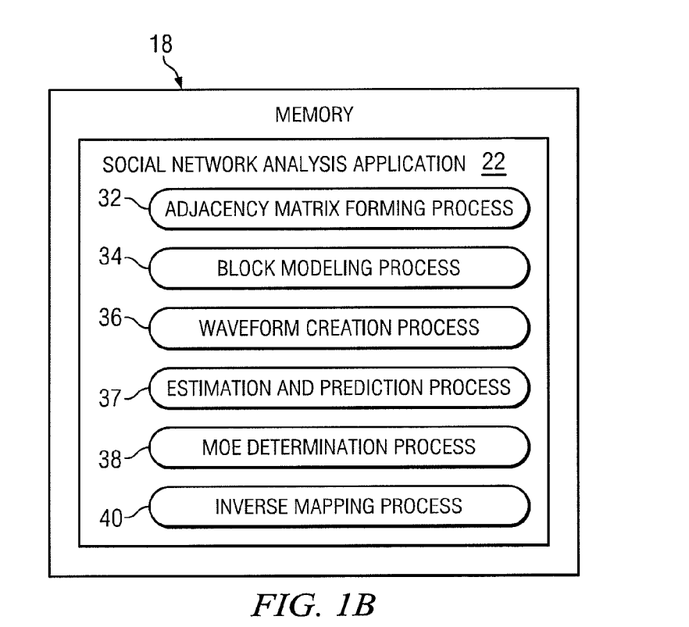
FIG. 1B illustrates an example semantic network analysis application that may be utilized by the semantic network analysis system of FIG. 1A, according to certain embodiments of the present disclosure.

As illustrated in FIG. 1B, certain embodiments of semantic network analysis application 22 include an adjacency matrix forming process 32, a block modeling process 34, a waveform creation process 36, an estimation and prediction process 37, a MOE determining process 38, and an inverse mapping process 40. Other embodiments of semantic network analysis application 22 may include additional processes, fewer processes, or differing types of processes. For example, semantic network analysis application 22 may also include a sensor mapping process that maps information generated by sensors 14 into a form suitable for use by adjacency matrix forming process 32. Adjacency matrix forming process 32, block modeling process 34, waveform creation process 36, estimation and prediction process 37, MOE determining process 38, and inverse mapping process 40 are described in more detail below.

Returning to FIG. 1A, computing system 12 executes semantic network analysis application 22 in order to map data regarding semantic networks (i.e., semantic network data 35) from its raw format into waveforms that may be manipulated, visualized, and/or merged with one another to determine useful information about a semantic network. A waveform analysis tools may be then be applied to the data to understand and track the data. For example, such waveform analysis tools may be selected by analyst 19 and may include spectrum analysis, waveform gating and measurement concepts, and tracking concepts (e.g., predicting and smoothing a consistently-shaped spectrum). In certain embodiments, multiple waveforms generated from multiple sets of semantic network data 35 may be merged on a periodic basis using a Kalman filter or other suitable analysis tool to predict future semantic network behavior and smooth or filter out noisy measurements received from sensors 14. Additionally, in certain embodiments, waveforms may be used to develop and monitor one or more MOEs that monitor various characteristics of the semantic network.

Embodiments of semantic network analysis application 22 may include logic contained within a medium. Logic may include hardware, software, and/or other logic. The medium in which the logic is encoded may include a tangible medium. The logic may perform operations when executed by processor 20. Certain logic may include a computer program, software, computer executable instructions, and/or instructions capable being executed by computing system 12. The logic may also be embedded within any other suitable medium without departing from the scope of the disclosure.

A semantic network generally includes multiple individuals or entities (nodes) that are interconnected with one another through one or more relationships (ties). One example of a semantic network may include a social network including an organization, such as a business having multiple employees. Employees of the business may be represented by nodes while their relationship with other employees (or other reasons for associating employees to one another) may be referred to as ties.

Although semantic network analysis system 10 as described herein is utilized to analyze social networks, as described briefly above, certain embodiments may be used for other analytical purposes. For example, certain embodiments of semantic network analysis system 10 may be used to perform cyber forensics on computer systems and/or computer networks. Because semantic network analysis system 10 may merge information received from sensors 14 in an evolving, periodic manner, the merged information may be used to determine temporal events that have occurred in the past or may occur in the future with computing systems or computing networks.

As another example, certain embodiments of semantic network analysis system 10 may be used to perform prognostics on systems in which future failures of the systems may be analyzed to determine one or more appropriate logistics procedures, such as preventative maintenance schedules to be applied to the systems. As another example, certain embodiments of semantic network analysis system 10 may be used to perform supply-chain-management analysis in which nodes of the network may include products or services transferred among businesses and ties include procedures under which the products or services are transferred. The predictive analysis provided by semantic network analysis system 10 may be used to determine trends in the supply-chain-management process and take appropriate corrective action where necessary.

As another example, certain embodiments of semantic network analysis system 10 may be used to monitor marketing trends, such as those businesses who conduct e-commerce over public networks, such as the Internet. Semantic network analysis system 10 may receive information from sensors 14 coupled to the public network to analyze purchasing trends, such as demographical information associated with certain consumers. As another example, certain embodiments of semantic network analysis system 10 may conduct intelligence, surveillance, and reconnaissance (ISR) activities to monitor the behavior of certain organization and their constituent individuals.

Although the present disclosure contemplates a variety of semantic networks, for clarity the remainder of this description primarily focuses on embodiments in which the semantic network comprises a social network. However, it should be understood that the present disclosure is not limited to such embodiments.

The components of computing system 12 may be implemented using any suitable combination of software, firmware, and hardware. These components may be implemented using one or more computer systems at one or more locations. Each computer system may include any appropriate input devices, output devices, mass storage media, processors, memory, or other suitable components for receiving, processing, storing, and communicating data. For example, each computer system may include a personal computer, workstation, network computer, kiosk, wireless data port, personal data assistant (PDA), one or more Internet Protocol (IP) telephones, one or more servers, a server pool, one or more processors within these or other devices, or any other suitable processing device.

In operation of an example embodiment of semantic network analysis system 10, social network analysis application 22, upon execution by processor 20, accesses semantic network data 35. As described above, semantic network data 35 indicates each of the nodes of a semantic network and the ties between each of the nodes at a particular time. After accessing semantic network data 35, social network analysis application 22 generates a waveform 56 from the accessed semantic network data 35. The generated waveform 56 indicates an activity level of each of the nodes within the organization at the particular time associated with the semantic network data 35. An example of a generated waveform 56 is illustrated below in FIG. 5. In certain embodiments, the generated waveform 56 is rearranged into a meaningful form. In certain embodiments, waveform 56 is then transmitted to client 17 where it may be displayed on GUI 16.

In certain embodiments, social network analysis application 22, upon execution by processor 20, may generate multiple waveforms 56 that indicate an activity level of each of the nodes of a particular social network at multiple times. For example, social network analysis application 22 may access a first set of semantic network data 35 indicating a first plurality of nodes within a semantic network and a first plurality of relationships between the first plurality of nodes at a first time. Social network analysis application 22 may additionally access a second set of semantic network data 35 indicating a second plurality of nodes within the same semantic network and a second plurality of relationships between the second plurality of nodes at a second time (e.g., a time before or after the first time). In certain embodiments, the generated waveforms may be analyzed in order to track and/or uncover the evolving nature of the semantic network.

In certain embodiments, social network analysis application 22 may generate multiple waveforms 56 that indicate an activity level of each of the nodes of a particular social network based on an ordering criteria other than time. For example, social network analysis application 22 may create an ordered set according to an ordering criteria due to node and/or edge states. In such an embodiment, the ordering rule may be "mapped" to a "pseudo-time." An example of such an embodiment includes investigations of alternate supply-chain paths with different instances of logistics semantic networks.

Embodiment of social network analysis application 22 may utilize any appropriate technique or process to generate waveform 56 from semantic network data 35. In some embodiments, social network analysis application 22 generates waveform 56 directly from semantic network data 35. In other embodiments, social network analysis application 22 generates waveform 56 from semantic network data 35 using an imaging technique. As one example of an imaging technique that may be utilized by social network analysis application 22 to generate waveform 56 from semantic network data 35, adjacency matrix forming process 32 accesses semantic network data 35 received from sensors 14 at one or more times and creates one or more adjacency matrices 44 (an example of which is shown in FIG. 2B) from the accessed semantic network data 35. Block modeling process 34 receives adjacency matrices 44 from adjacency matrix forming process 32 and modifies each of the adjacency matrices 44 according to one or more rules. Waveform creation process 36 receives the modified adjacency matrices 44 from block modeling process 34, generates waveform 56 from adjacency matrices 44, and in some embodiments, displays the generated waveform 56 on GUI 16. In certain embodiments, MOE determination process 38 evaluates one or more measures of effectiveness and, potentially, displays the results on GUI 16. In certain embodiments, inverse mapping process 40 receives waveform 56, inverts the waveform into an organization structure 58, and displays the organization structure 58 on GUI 16. Additional details of each of these processes are discussed below.

Figure 2A:
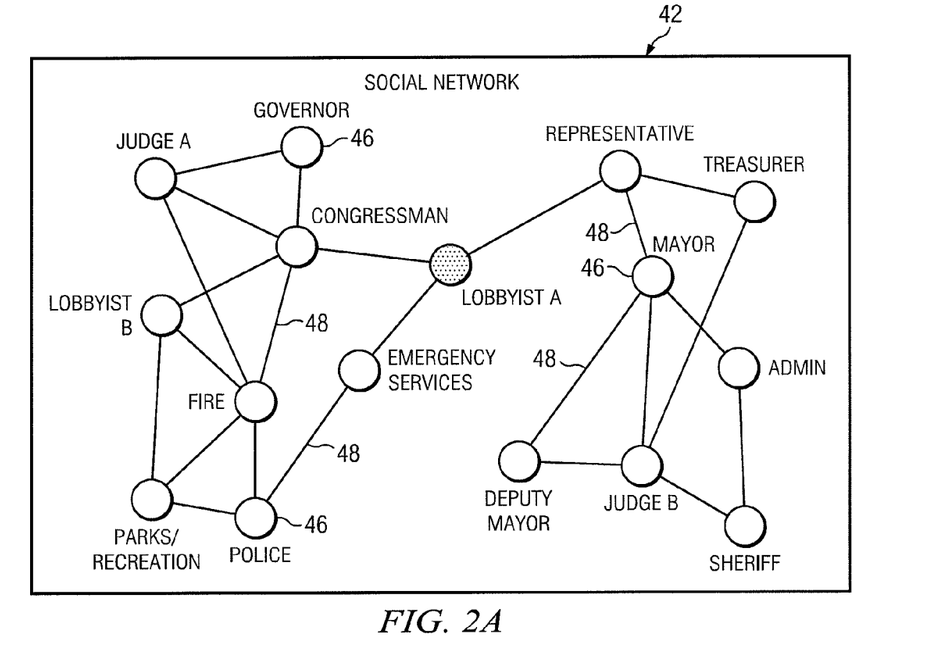
FIG. 2A illustrates an example graph of a social network that may be analyzed by the semantic network analysis system of FIG. 1A, according to certain embodiments of the present disclosure.
Figure 2B:
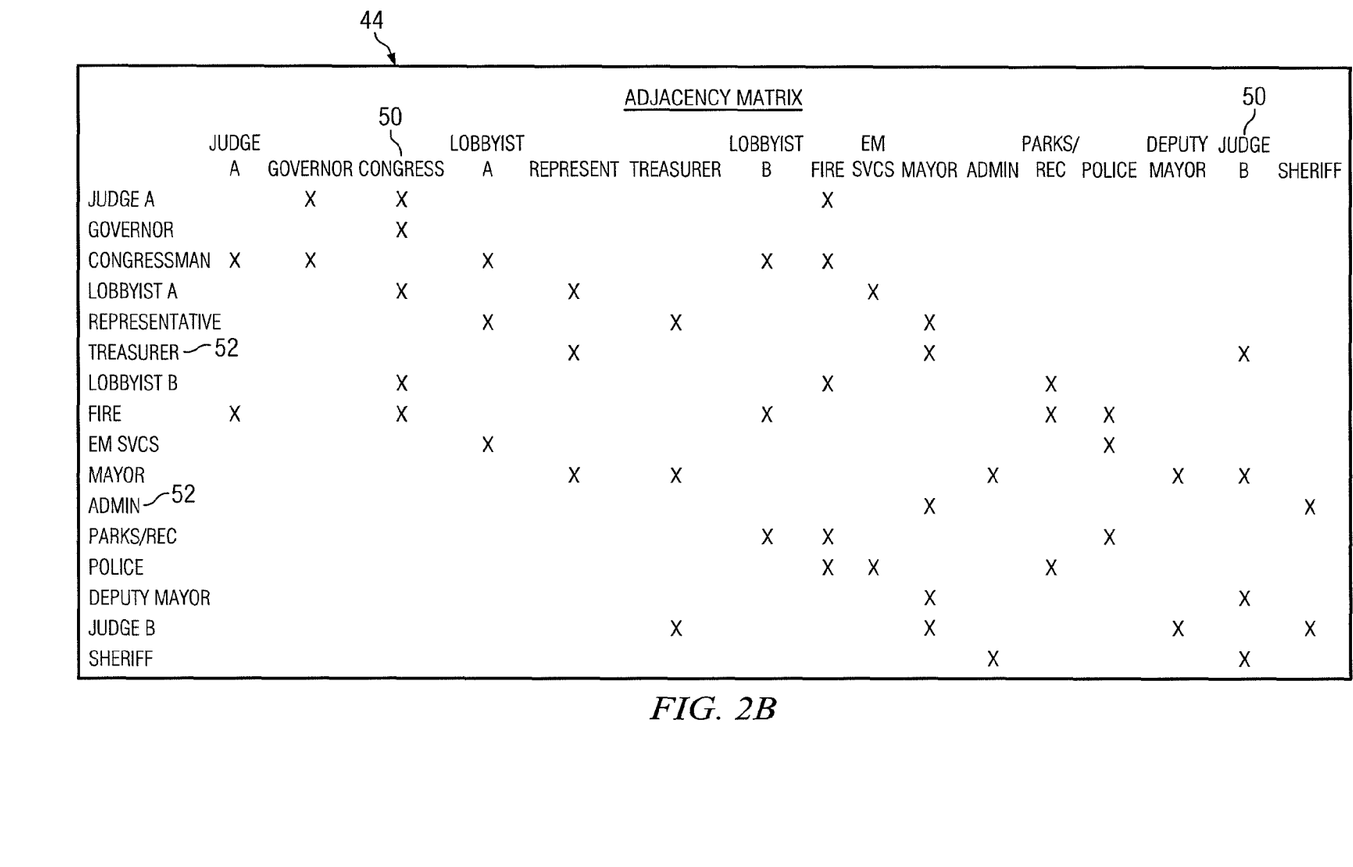
FIG. 2B illustrates an example adjacency matrix that may be formed by the adjacency matrix forming process of the semantic network analysis application of FIG. 1B, according to certain embodiments of the present disclosure.

FIGS. 2A and 2B illustrate an example graph of a social network 42 and an example adjacency matrix 44 that may be formed by adjacency matrix forming process 32. Social network 42 includes one or more nodes 46 that represent individuals of an organization and ties 48 that represent relationships among the individuals of the organization. Adjacency matrix forming process 32 identifies nodes 46 of the organization and constructs adjacency matrix 44 according to ties 48 between adjacent nodes 46. In certain embodiments, adjacency matrix 44 includes multiple columns 50 and rows 52 that each represents individuals or nodes 46 of the organization. An 'X' represents a tie or relationship between a particular individual represented by that row and another individual represented by that column.

Figure 3:
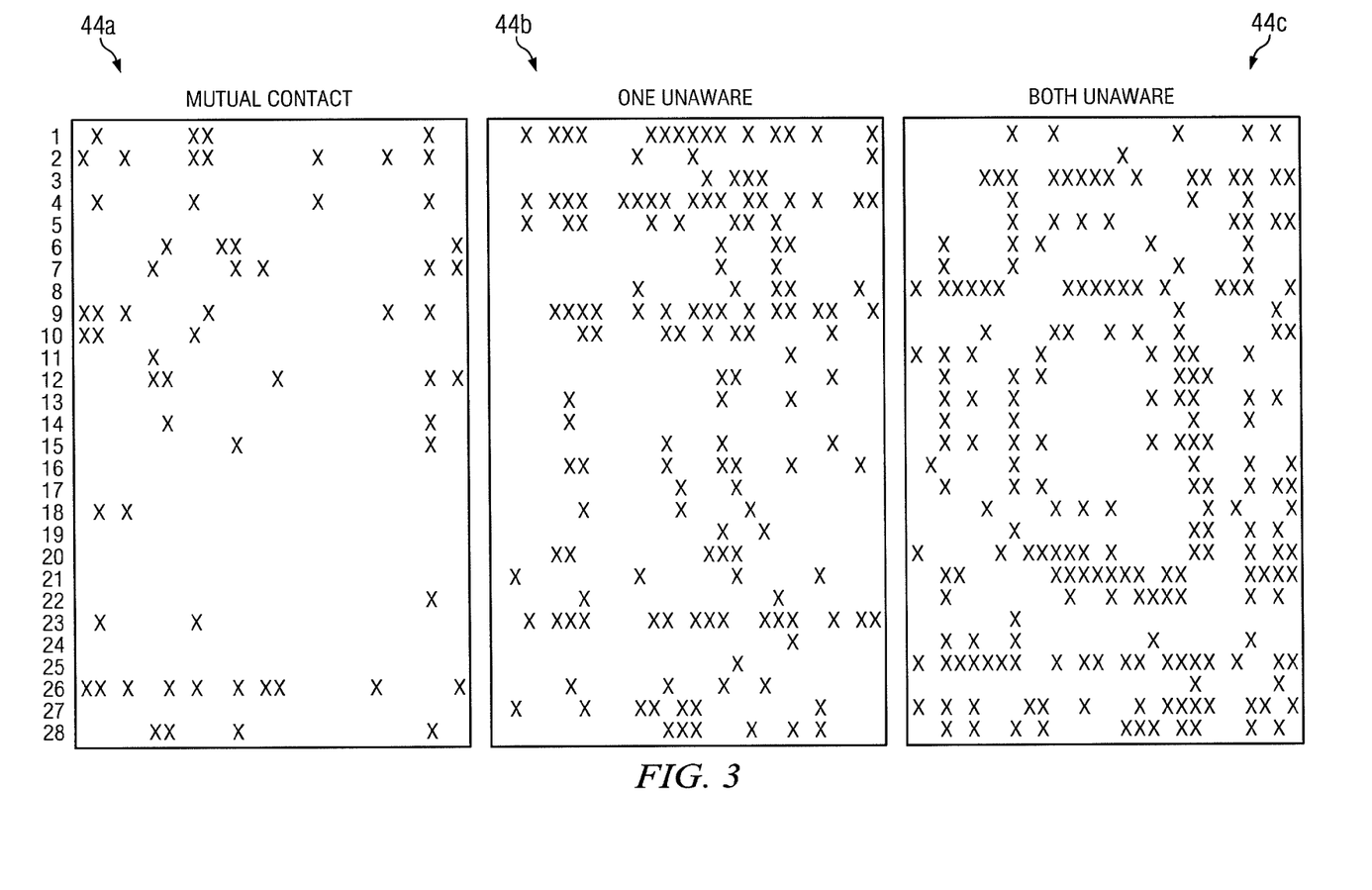
FIG. 3 illustrates example adjacency matrices that may be generated by the example adjacency matrix forming process of FIG. 1A, according to certain embodiments of the present disclosure.

FIG. 3 illustrates example adjacency matrices 44a, 44b, and 44c of a social network that may be generated by the example adjacency matrix forming process 32 described above with reference to FIG. 1B. Adjacency matrix 44a may include ties 'X' representing mutual contacts among individuals of the social network. Adjacency matrix 44b may include ties 'X' representing a one way awareness of individuals of the organization relative to other individuals of the organization. Adjacency matrix 44c may include ties 'X' representing relationships in which both individuals are generally unaware of one another. Similar to FIG. 2B above, adjacency matrices 44a, 44b, and 44c each include multiple columns and rows that each represents nodes of the organization. An 'X' represents a tie or relationship between a particular node represented by that row and another node represented by that column.

Figure 4:
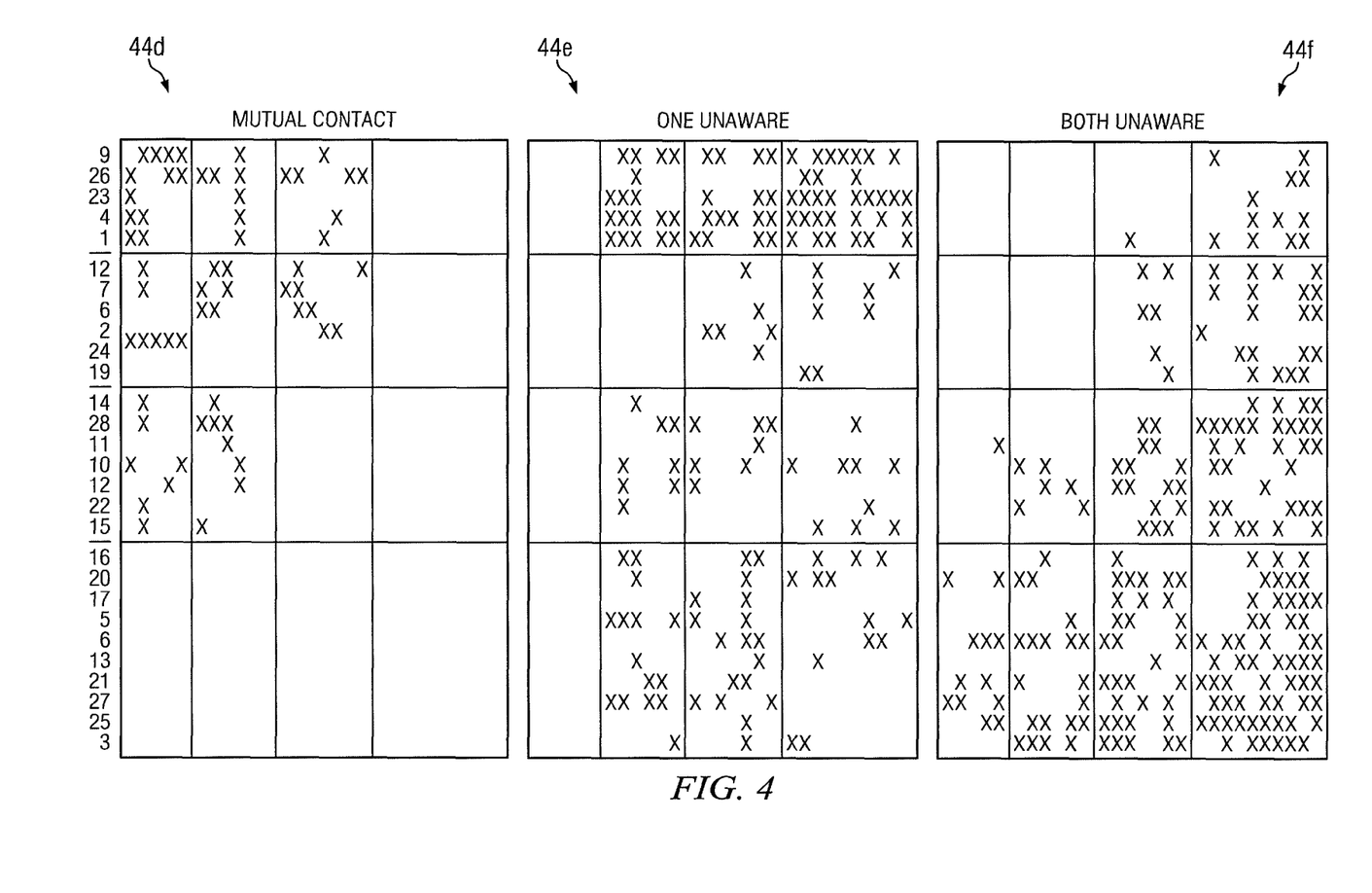
FIG. 4 illustrates example modified adjacency matrices generated by the example block modeling process described with reference to FIG. 1A, according to certain embodiments of the present disclosure.

FIG. 4 illustrates example modified adjacency matrices 44d, 44e, and 44f that may be generated by block modeling process 34 by manipulating adjacency matrices 44a, 44b, and 44c of FIG. 3. Modified adjacency matrix 44d includes rows 52 and/or columns 50 of adjacency matrix 44a that have been sorted in order to derive a particular pattern. Modified adjacency matrix 44e includes rows 52 and/or columns 50 of adjacency matrix 44b that have been sorted in order to derive another particular pattern. Modified adjacency matrix 44f includes rows 52 and/or columns 50 of adjacency matrix 44c that have been sorted in order to derive a particular pattern. The particular patterns of modified adjacency matrices 44d, 44e, and 44f may be derived according to certain rules, as described in more detail below.

In certain embodiments, block modeling process 34 may generate modified adjacency matrices 44d, 44e, and 44f by manipulating adjacency matrices 44a, 44b, and 44c according to one or more rules stored in block model image store 24 of memory 18. The one or more rules stored in block model image store 24 may provide criteria from which rows 52 and columns 50 representing individuals may be sorted. The one or more rules may include various levels of equivalency from which block modeling process 34 may sort rows 52 and columns 50. For example, an organization having a relatively high hierarchical nature may have one or a small group of individuals who dictate the actions of the organization. Conversely, the organization having an egalitarian nature may have authority dispersed throughout the organization at a relatively greater level.

The one or more rules stored in block model image store 24 may include equivalency threshold values that may be operable to delineate information from sensors 14 to determine the nature of the organization and sort rows and columns 50 according to the equivalency values. Thus, information provided by sensors 14 may include certain characteristics that may be used by block modeling process 34 to apply equivalency criteria to sort rows 52 and columns 50 to obtain useful information about the organization.

In certain embodiments, block modeling process 34 receives adjacency matrices 44, rearranges the rows 52 and columns 50 of the received adjacency matrices 44, and attempts to find relations or patterns in the modified adjacency matrices 44 using a block modeling technique. In certain embodiments, block modeling process 34 may perform a block modeling process using a priority matching technique. The priority matching technique generally incorporates the steps of assuming several potential patterns of that adjacency matrix 44 may have, sorting the rows 52 and columns 50 according to the assumed patterns, and determine which pattern best matches the adjacency matrix 44.

In certain embodiments, block modeling process 34 may perform a non-pattern based block modeling technique in which rows 52 and columns 50 of adjacency matrix 44 may be sorted according to one or more pre-defined equivalency and/or symmetry rules. The non-pattern based block modeling technique may provide pattern matching in certain cases in which the nature of the organization does not conform well to established organizational structures. For example, a particular organization may have an official corporate structure while actions of the organization may be dictated from individuals other than the stated leaders of the organization. Thus, the non-pattern based block modeling technique may be used to determine non-standard hierarchal structures of the organization according to certain embodiments.

In certain embodiments, block modeling process 34 sorts rows 52 and columns 50 representing nodes 46 of the semantic network according to one or more a priori rules comprising templates of structure. That is, block modeling process 34 may sort rows 52 and columns 50 of adjacency matrix 44 according to established presumptions of associative behavior. For example, one individual acting as manager or superior of another individual may initiate communication relatively more often than another individual initiates communication with his or her manager. Thus, one particular a priori rule may assign a managerial relationship according to a level of initiated contact between two adjacent individuals of the social network 42.

In certain embodiments, block modeling process 34 sorts rows 52 and columns 50 representing nodes 46 of the semantic network according to one or more a posteriori rules associated with the social network 42. These a posteriori rules may be determined according to previous adjacency matrices 44 generated by adjacency matrix forming process 32. For example, a previously generated adjacency matrix 44 may reveal certain clues about the organizational structure of the individuals of the organization. Block modeling process 34 may use one or more previously generated adjacency matrices 44 in conjunction with the elapsed time from the presently available information from sensors 14 to develop one or more a posteriori rules from which rows 52 and columns 50 may be sorted.

Figure 5:
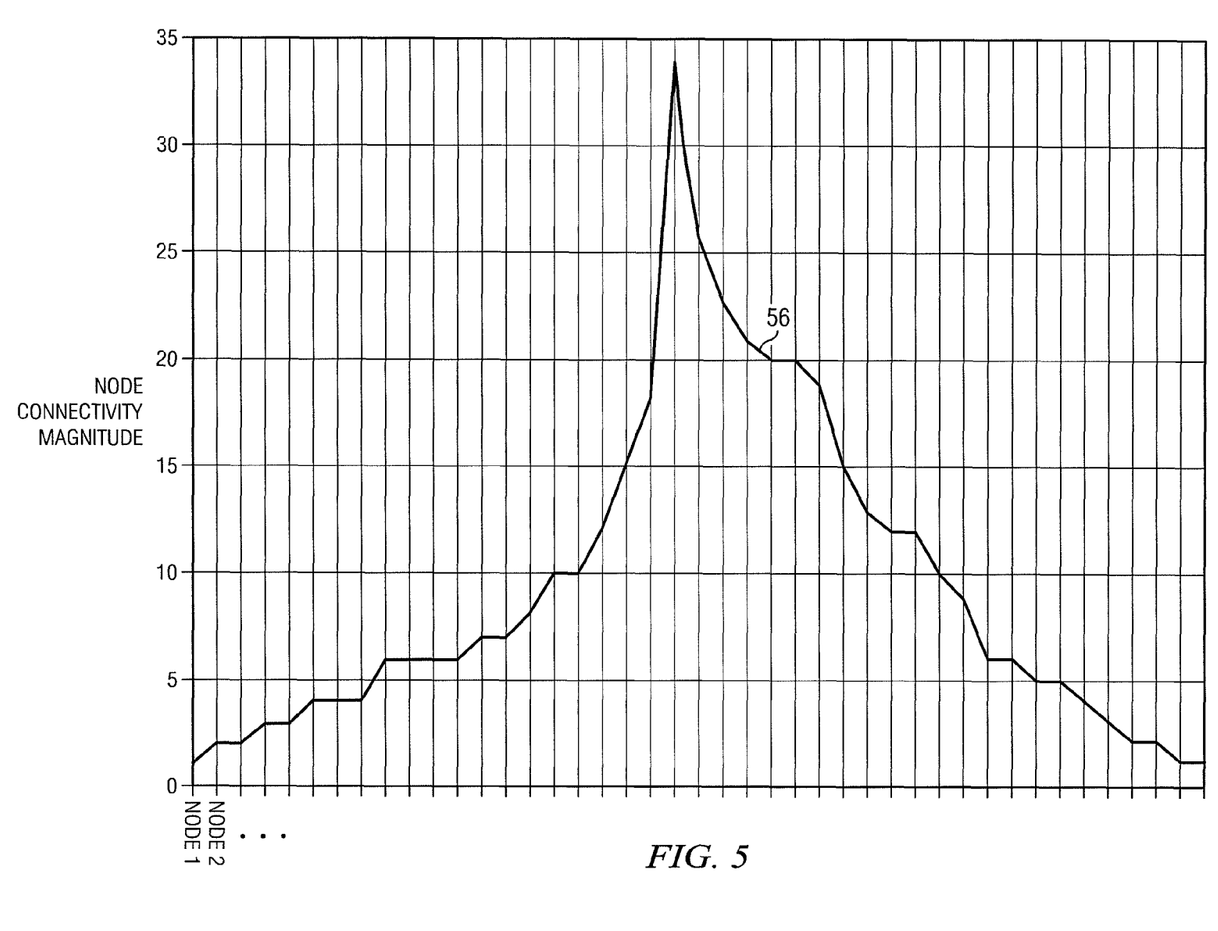
FIG. 5 illustrates a waveform that may be generated by the semantic network analysis system of FIG. 1A, according to certain embodiments of the present disclosure.

FIG. 5 illustrates a waveform 56 that may be generated by the semantic network analysis system of FIG. 1A from semantic network data 35. In some embodiments, waveform 56 may be generate directly from semantic network data 35 and possibly rearranged into a meaningful form. For example, waveform 56 of FIG. 5 illustrates how waveform 56 may be arranged into a form that includes the node with the greatest magnitude of connectivity being plotted in the middle of the horizontal axis. In other embodiments, waveform 56 may be arranged in any other suitable form.

In certain embodiments, waveform 56 may be generated by the example waveform creation process 36 described above with reference to FIG. 18. In these embodiments, waveform creation process 36 generates the waveform according to adjacency matrices 44 and/or one or more previously generated waveforms stored in waveform store 28. Waveform 56 generally indicates an activity level among individuals of the organization. In many respects, the mapping of adjacency matrix 44 into waveform 56 may be somewhat similar to mapping a time-based signal into a frequency-based signal using a Fourier transform. By mapping adjacency matrices 44 to waveform 56, activities among individuals may be quantified in a meaningful manner to determine certain characteristics of the organization.

Certain embodiments of the present disclosure may provide one or more technical advantages. For example, certain embodiments of the semantic network analysis system 10 may generate waveforms 56 from social networks 42 using a binning technique in which information from sensors 14 is categorized according to certain threshold levels. In this manner, spurious noise may be filtered from the waveform 56 to reveal useful information. For example, graphs representing social networks 42 may be mapped into a domain to provide meaningful analysis of the social network 42 and/or provide additional processing techniques to be applied to the acquired information. In certain embodiments for example, graphs may be mapped into a waveform 56 to observe behavioral changes in the network by viewing it in its new domain. Additionally, estimation and prediction process 37 may combine multiple sequential adjacency matrices 44 using a Kalman filter or other estimation and prediction technique to determine additional information about the evolving nature of the semantic network. Thus, mapping adjacency matrices 44 associated with social networks 42 to waveforms 56 may provide information about social networks 42 that has heretofore not been realized.

Waveform creation process 36 may create waveform 56 from adjacency matrix 44 in any suitable manner. In certain embodiments, waveform creation process 36 generates waveform 56 from adjacency matrix 44 by placing individuals of the organization along the X-axis and assigning values to each individual according to their activity level in the social network 42. In certain embodiments, waveform creation process 36 generates waveform 56 from adjacency matrix 44 by binning the weighted ties 48 of adjacency matrix 44 of individuals of the social network 42. Thus, if there is a relationship in the social network 42 that had a particular weighting that generally depends on the frequency of events that occur between two nodes 46, then binning of those two nodes 46 would have different activity based on that frequency. From such as waveform 56, the behavior or intensity or activity of the social network may be assessed. In certain embodiments, waveform creation process 36 may assign a longest path line through nodes 46 of the social network 42. From a resulting binning technique, information associated with the greatest influence of certain nodes 46 may be determined.

Waveform creation process 36 may receive signals (e.g., user input 57) from GUI 16 to alternatively generate waveform 56 according to the differing techniques described above. For example, a certain node 46 may be chatty in the respect that the certain node 46 may not be a leader, but rather a messenger who relays information from certain individuals to others. The analyst 19 may invoke GUI 16 to instruct waveform creation process 36 to generate waveform 56 from weighted ties 48 to determine a level of activity among nodes 46, and subsequently invoke GUI 16 to instruct waveform creation process 36 to generate another waveform 56 according to the longest path line technique to determine the origination of communications that may indicate the actual source node 46 or leader of the social network 42. Other graph analysis tools that may be utilized by waveform creation process 36 to generate waveform 56 include, but are not limited to, "betweeness," "centrality," shortest path, K-shortest path, and the like.

Figure 6:
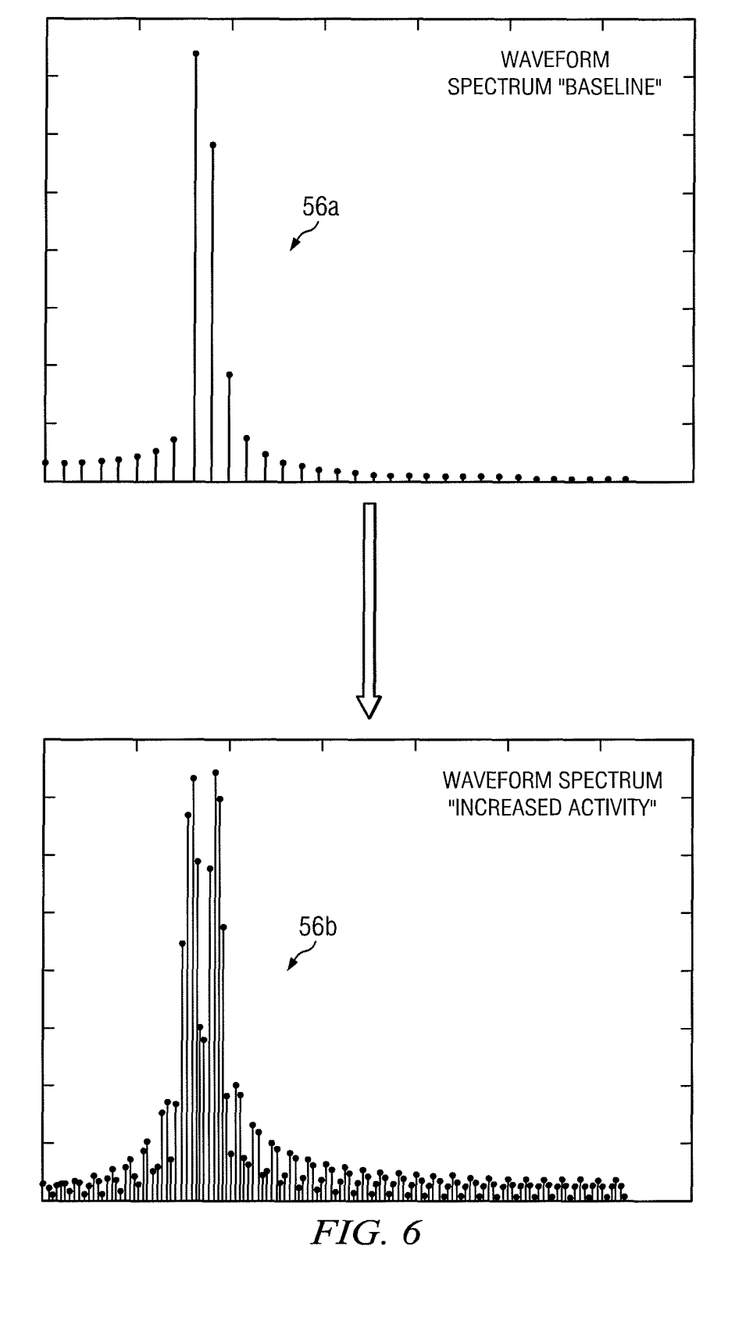
FIG. 6 illustrate two sequential waveforms that may be generated by the semantic network analysis system of FIG. 1A, according to certain embodiments of the present disclosure.

FIG. 6 illustrates two sequential waveforms 56a and 56b that may be generated by the semantic network analysis system of FIG. 1A. In certain embodiments, waveforms 56a and 56b may be generated by waveform creation process 36 described above. Waveform 56a may be generated from semantic network data 35 acquired from sensors 14 previous to information that is used to generate waveform 56b by waveform creation process 36. As shown, waveform 56b shows an increased level of activity relative to the activity shown by waveform 56a. Certain embodiments of semantic network analysis system 10 may include a gate tracking algorithm to trigger off variations such as this to alert analyst 19 and/or modify filters from which ensuing waveforms 56 are analyzed.

In certain embodiments, estimation and prediction process 37 includes a Kalman filter process that iteratively combines newly generated adjacency matrices with existing adjacency matrices 44. Thus for an evolving social network 42, newly acquired information may be merged with existing information to increase the confidence level of the information in a relatively efficient manner to track and/or monitor the behavior of the social network 42. Certain embodiments of estimation and prediction process 37 incorporating a Kalman filter may provide an advantage in that without having to recalculate from the start every time new information is acquired from sensors 14. Additionally, Kalman filters may combine more than one waveform 56 into a particular filter to balance the resulting waveforms 56.

Returning to FIG. 1B, MOE determination process 38 generally evaluates, using one or more measures-of-effectiveness (MOEs), waveforms 56 such as those generated by waveform creation process 36. MOEs generally include quantified parameters stored in MOE store 26 that may be derived from waveforms 56 to provide an assessment of the state of semantic networks, such as social network 42, the intensity of nodes 46 of semantic networks, or other factors that may indicate what is occurring in semantic networks. In certain embodiments, MOEs may be adjusted to compensate for evolving changes in semantic networks. For example, one MOE may include a threshold value of activity level of any one individual or node 46 in social network 42. Given the general communication level of the organization, the threshold value may be set to a specified value such that an increase in communication traffic over this level triggers an alarm. As time continues, the general communication level of the organization may increase. Thus, the threshold value of the particular MOE may be increased to compensate for a corresponding increase in general communication level of individuals of social network 42.

Returning to FIG. 1B, certain embodiments of semantic network analysis application 22 may include inverse mapping process 40 that generates an estimated graph of the semantic network using generated waveform 56. For example, certain embodiments of inverse mapping process 40 may access relationship criteria or ties 48 from a generated waveform 56 and generate an estimated graph of the organization structure. The estimated graph generated by inverse mapping process 40 may include nodes that represent individuals of the organization and ties that represent their association with one another. Although generated waveform 56 may provide enhanced visualization of relationship factors associated with the semantic network, they may not readily reveal the hierarchal structure of the social network 42. Inverse mapping process 40 estimates the hierarchal structure according to waveforms 56 generated by waveform creation process 36 and generates an estimated graph that may be displayed on GUI 16 for assessing the hierarchal structure of semantic networks.

Figure 7:
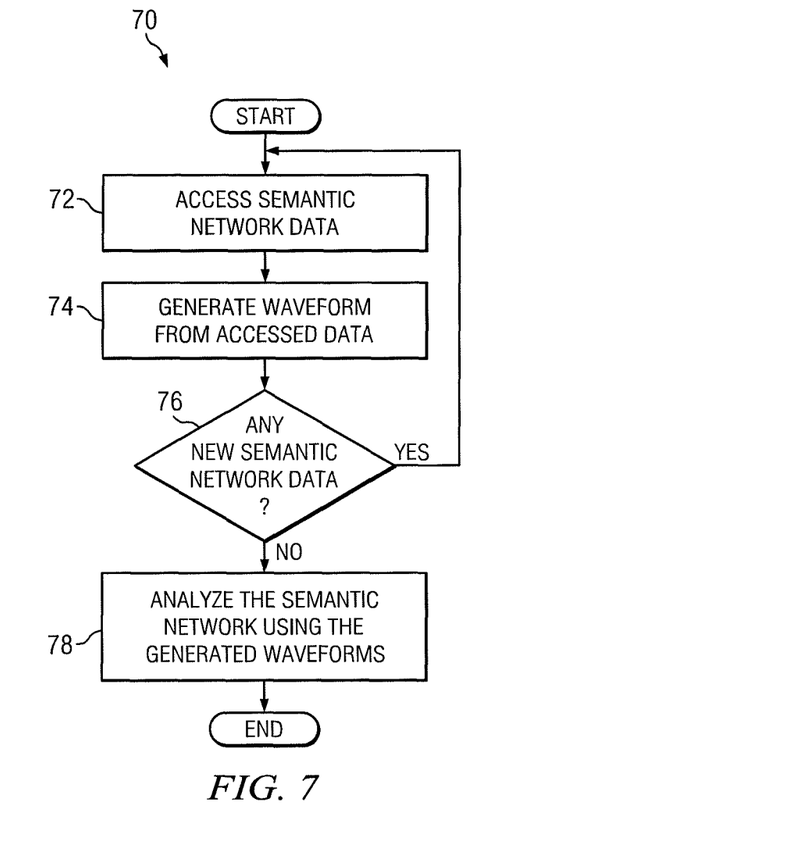
FIG. 7 illustrates an example method for providing semantic network analysis, which may be performed by the example system of FIG. 1A according to certain embodiments of a present disclosure.

FIG. 7A illustrates an example method 70 for providing semantic network analysis, which may be performed by the example system of FIG. 1A according to certain embodiments of a present disclosure. The example method may be implemented in any suitable combination of software, firmware, and hardware. Although particular components may be identified as performing particular steps, the present disclosure contemplates any suitable components performing the steps according to particular needs.

At step 72, a processing system such as computing system 12 described above accesses first data associated with a semantic network. The accessed first data may refer to semantic network data 35 described above. The first data indicates a first plurality of nodes within the semantic network and a first plurality of relationships between the first plurality of nodes at a first time.

At step 74, the processing system generates a first waveform from the first data accessed in step 72. The generated first waveform indicates a first activity level of each of the first nodes within the semantic network at the first time. The generated waveform of step 74 may refer to waveform 56 described above. In certain embodiments, step 74 generates waveform 56 directly from the first data accessed in step 72, as described above. In other embodiments, step 74 generates waveform 56 from the first data accessed in step 72 using an imaging process, as described above. In certain embodiments, step 72 may include utilizing adjacency matrix forming process 32, block modeling process 34, and waveform creation process 36 as described above.

In step 76, the processing system determines whether any data exists for the semantic network for a time other than the first time associated with the first data accessed in step 72. For example, the processing system may determine that there is second data associated with the semantic network at a second time. If the processing system in step 76 determines that there is not additional data for the semantic network, method 70 proceeds to step 78. If the processing system in step 76 determines that there is additional data for the semantic network, method 70 proceeds back to step 72 and repeats steps 72 and 74 described above for the second data.

In step 78, the processing system analyzes the semantic network using any waveforms generated in step 74. In one embodiment, step 78 may include comparing two or more waveforms generated in step 74 for a particular semantic network. For example, step 78 may include comparing a first waveform generated for a first time with a second waveform generated for a second time for a particular semantic network (i.e., sequential waveforms 56a and 56b described above.) In other embodiments, step may include utilizing MOE determination process 38 described above.

In some embodiments, step 78 may include using a waveform analysis tools to analyze and track the semantic network. In certain embodiments, the waveform analysis tools may include spectrum analysis, waveform gating and measurement concepts, and tracking concepts (e.g., predicting and smoothing a consistently-shaped spectrum). In certain embodiments, multiple waveforms generated in step 74 from multiple sets of data such as semantic network data 35 may be merged on a periodic basis using a Kalman filter or other suitable analysis tool to predict future semantic network behavior and smooth or filter out noisy measurements in data accessed in step 72.

After step 78, certain embodiments of method 70 end. Other embodiments of method 70, however, may include additional steps. For example, inverse mapping process may utilized to generate an estimated organization structure. In some embodiments, the generated waveforms of step 74 and/or the generated estimated organization structure may be displayed on a GUI such as GUI 16.

Figure 8:
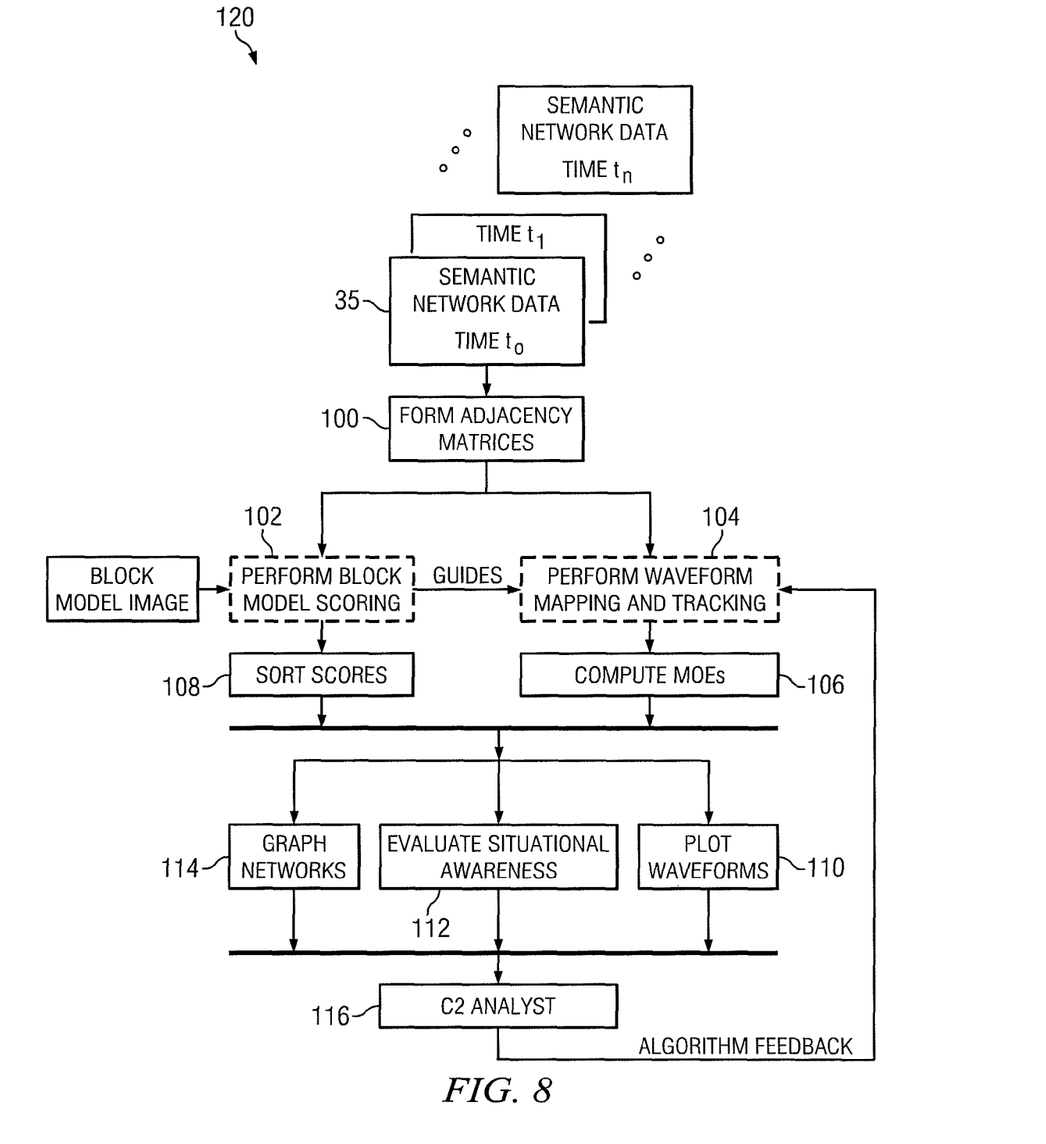
FIG. 8 illustrates one embodiment of a process that may be used by the example social network analysis system of FIG. 1A.

FIG. 8 illustrates one embodiment of a method 120 that may be used by the example semantic network analysis system 10 of FIG. 1A. In act 100, adjacency matrix forming process 32 forms adjacency matrices 44 from periodic semantic information (such as semantic network data 35) received from sensors 14. In act 102, block modeling process 34 receives adjacency matrices 44 from adjacency matrix forming process 32 and sorts nodes 46 of adjacency matrices 44 according to rules specified in block model image store 24. In act 104, waveform creation process 36 generates waveforms 56 from modified adjacency matrices 44 created by block modeling process 34 and may perform estimation and prediction process 37. In act 106, one or more MOEs may be computed from the generated waveforms 56.

Acts 108 through 116 generally refer to interactive actions that may be performed by the user to manipulate or adjust operation of semantic network analysis system 10. However, the present disclosure contemplates these acts being performed automatically or manually, in whole or in part. In act 108, scores determined by block modeling process 34 may be sorted manually by the user through GUI 16 to adjust or tweak the rules by which adjacency matrices 44 are modified. In act 110, waveform creation process 36 may display waveforms 56 on GUI 16 for view by the user. In act 112, MOE determination process 38 may display MOEs on GUI 16 for view by the user. In act 114, inverse mapping process 40 may display the estimated organization structure 58 on GUI 16 for view by the user. In act 116, the user may adjust certain values associated with operation of semantic network analysis system 10. For example, the user may modify coefficients associated with operation of the Kalman filter to adjust the importance of ensuing information processed by the Kalman filter. As another example, the user may modify certain rules associated with the relationship of nodes 46 with one another such that ensuing modified adjacency matrices 44 may be modified to tweak results of semantic network analysis system 10.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A system, comprising:
   one or more memory units; and
   one or more processing units operable to:
      create a first adjacency matrix using a first set of data associated with a semantic network, the first set of data associated with a first time;
      create a second adjacency matrix using a second set of data associated with the semantic network, the second set of data associated with a second time subsequent to the first time;
      using an estimation and prediction process, combine the first and second adjacency matrices utilizing a filter to generate a third adjacency matrix, the third adjacency matrix being associated with an increased confidence level compared to the first adjacency matrix;
      modify the third adjacency matrix according to the one or more rules;
      generate a waveform from the third adjacency matrix, wherein the waveform indicates an activity level of individual nodes of the semantic network; and
      generate an estimated structure of the semantic network according to the waveform.

2. The system of claim 1, wherein the estimated structure comprises an organization structure.

3. The system of claim 1, wherein the one or more processing units are operable to:
   compare the waveform with one or more measures of effectiveness for evaluating one or more characteristics of the semantic network; and
   identify one or more measure of effectiveness values associated with the waveform.

4. The system of claim 3, further comprising one or more threshold values associated with the corresponding one or more measures of effectiveness, the one or more processing units operable to:
   generate an alarm if one of the one or more measures of effectiveness exceeds its associated threshold value.

5. The system of claim 1, wherein the one or more processors are operable to display the waveform on a user interface.

6. The system of claim 1, wherein the filter comprises a Kalman filter to generate the third adjacency matrix.

7. The system of claim 1, wherein the one or more rules comprise one or more a priori rules.

8. The system of claim 1, wherein the one or more rules comprise one or more a posteriori rules.

9. The system of claim 1, wherein the one or more rules may be iteratively modified through a user interface.

10. A computer-implemented method, comprising:
    creating a first adjacency matrix using a first set of data associated with a semantic network, the first set of data associated with a first time;
    creating a second adjacency matrix using a second set of data associated with the semantic network, the second set of data associated with a second time subsequent to the first time;
    using an estimation and prediction process, combine the first and second adjacency matrices utilizing a filter to generate a third adjacency matrix, the third adjacency matrix being associated with an increased confidence level compared to the first adjacency matrix;
    modifying the third adjacency matrix according to the one or more rules;
    generating a waveform from the third adjacency matrix, wherein the waveform indicates an activity level of individual nodes of the semantic network; and
    generating an estimated structure of the semantic network according to the waveform.

11. The computer-implemented method of claim 10, wherein generating the waveform comprises utilizing an imaging technique.

12. The computer-implemented method of claim 10, wherein modifying the third adjacency matrix according to the one or more rules comprises:
    utilizing the block modeling process to generate a modified third adjacency matrix from the generated third adjacency matrix.

13. The computer-implemented method of claim 10, further comprising:
    comparing the waveform with one or more measures of effectiveness for evaluating one or more characteristics of the semantic network; and
    identifying one or more measure of effectiveness values associated with the waveform.

14. The computer-implemented method of claim 10, wherein combining the first and second adjacency matrices comprises using a filter comprises using a Kalman filter.

15. A non-transitory computer-readable medium comprising software, the software when executed by one or more processing units operable to perform operations comprising:
creating a first adjacency matrix using a first set of data associated with a semantic network, the first set of data associated with a first time;
creating a second adjacency matrix using a second set of data associated with the semantic network, the second set of data associated with a second time subsequent to the first time;
using an estimation and prediction process, combine the first and second adjacency matrices utilizing a filter to generate a third adjacency matrix, the third adjacency matrix being associated with an increased confidence level compared to the first adjacency matrix;
modifying the third adjacency matrix according to the one or more rules;
generating a waveform from the third adjacency matrix, wherein the waveform indicates an activity level of individual nodes of the semantic network; and
generating an estimated structure of the semantic network according to the third waveform.

16. The non-transitory computer-readable medium of claim 15, wherein generating the waveform comprises utilizing an imaging technique.

17. The non-transitory computer-readable medium of claim 15, wherein modifying the third adjacency matrix according to the one or more rules comprises:
utilizing a block modeling process to generate a modified third adjacency matrix from the generated third adjacency matrix.

18. The system of claim 1 wherein the one or more processing units further operable to:
generate a first waveform from the modified first adjacency matrix, wherein the first waveform indicates an activity level of individual nodes of the semantic network at the first time;
generate a second waveform from the modified second adjacency matrix, wherein the second waveform indicates an activity level of individual nodes of the semantic network at the second time; and
merge the first and second waveforms using a filter to generate a third waveform, the third waveform including information predicted about the semantic network at third time subsequent to the second time.

19. The method of claim 10 further comprising:
generating, by the processing system, a first waveform from the first data, the first waveform indicating a first activity level of each of the first nodes within the semantic network at the first time;
generating, by the processing system, a second waveform from the second data, the second waveform indicating a second activity level of each of the second nodes within the semantic network at the second time; and
merging the first and second waveforms using a filter to generate a third waveform, the third waveform including information predicted about the semantic network at third time subsequent to the second time.

* * * * *